73315

Edward Flather's Baggage Check.

PATENTED JAN 14 1868

Witnesses
Theo Tische
J. A. Service

Inventor
Edw. Flather
Per Munn & Co
Attorneys

United States Patent Office.

EDWARD FLATHER, OF BRIDGEPORT, CONNECTICUT.

Letters Patent No. 73,315, dated January 14, 1868.

IMPROVED BAGGAGE-CHECK.

*The Schedule referred to in these Letters Patent and making part of the same.*

TO ALL WHOM IT MAY CONCERN:

Be it known that I, EDWARD FLATHER, of Bridgeport, in the county of Fairfield, and State of Connecticut, have invented a new and improved Baggage-Check; and I do hereby declare that the following is a full, clear, and exact description thereof, which will enable others skilled in the art to make and use the same, reference being had to the accompanying drawings, forming part of this specification.

This invention relates to a new and improved baggage-check, and consists of a slotted arm or bar revolving on a screw or rivet set in a circular disk, on which the names of various places or numbers are marked. The name of the place desired to be indicated is seen through the slot in the arm, which is secured in place by a pin attached to the arm, and fitting into a hole in the disk; or the required number may be indicated by the pin being set into the hole opposite thereto. In the accompanying drawings—

Similar letters of reference indicate like parts.

Figure 1:
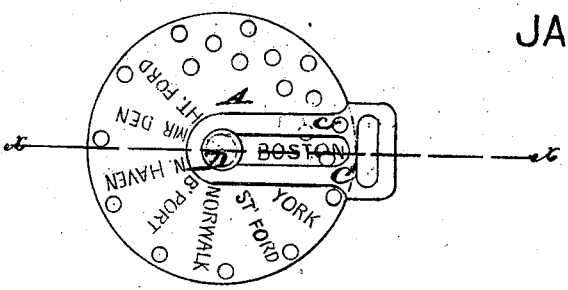
Figure 1 is a top view of my improved baggage-check set for Boston, but broken away to show the pin.
Figure 2:
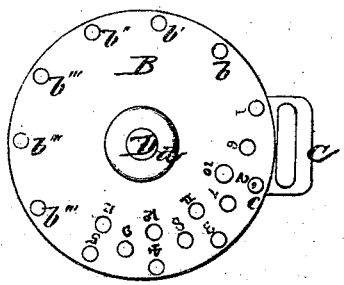
Figure 2 is a view of the reverse side.
Figure 3:
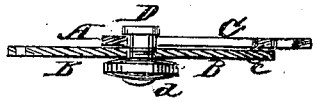
Figure 3 is a section of fig. 1 through the line $x\ x$.

A is one surface of a circular disk, of metal or other suitable material, having the names of places marked thereon. B is the reverse side of the same circular disk, having numbers instead of names of places; or the disk may be inscribed with names or numbers only on one or both surfaces. C is a slotted arm or bar, the name of the place to be indicated being shown through the slot; or the slot may be dispensed with, and the name indicated by the arm or bar C being set above or below it. D is a screw or rivet passing through the slot or its equivalent in the arm C, and set in the disk A B. $d$ is the nut securing the screw. $c$ is a pin on the arm C, which secures into the holes 1 2 3, &c., or $b\ b'\ b''\ b'''$, &c., shown in the surface, B, of the disk.

To use the check, the nut $d$ is loosened, the pin $c$ raised out of the hole in which it lay, and, if it is desired to indicate a name, the arm C is moved round on the set-screw D until the required name on the surface A is shown through the slot, when the pin $c$ drops into a hole, and the nut $d$ being screwed up, the required name continues to be shown through the slot until the nut is loosened for the purpose of indicating the name of some other place. To indicate a number, the arm C, if slotted, is slid along the screw until the pin $c$ lies in the circle in which is the hole bearing the required number or surface, B, and the arm C is then turned on the screw until the pin $c$ reaches such numbered hole, when it is set into it, the last-mentioned operation only being performed if the arm be not furnished with a slot, and the nut $d$ is then screwed up, securing the pin in place in the hole.

I claim as new, and desire to secure by Letters Patent—

The indicator-arm C, revolving on the set-screw or rivet D, and their respective equivalents, in combination with the disk A B, substantially as herein set forth and described.

EDWARD FLATHER.

Witnesses:
LORIN FOLLETT,
CURTIS THOMPSON.